UNITED STATES PATENT OFFICE.

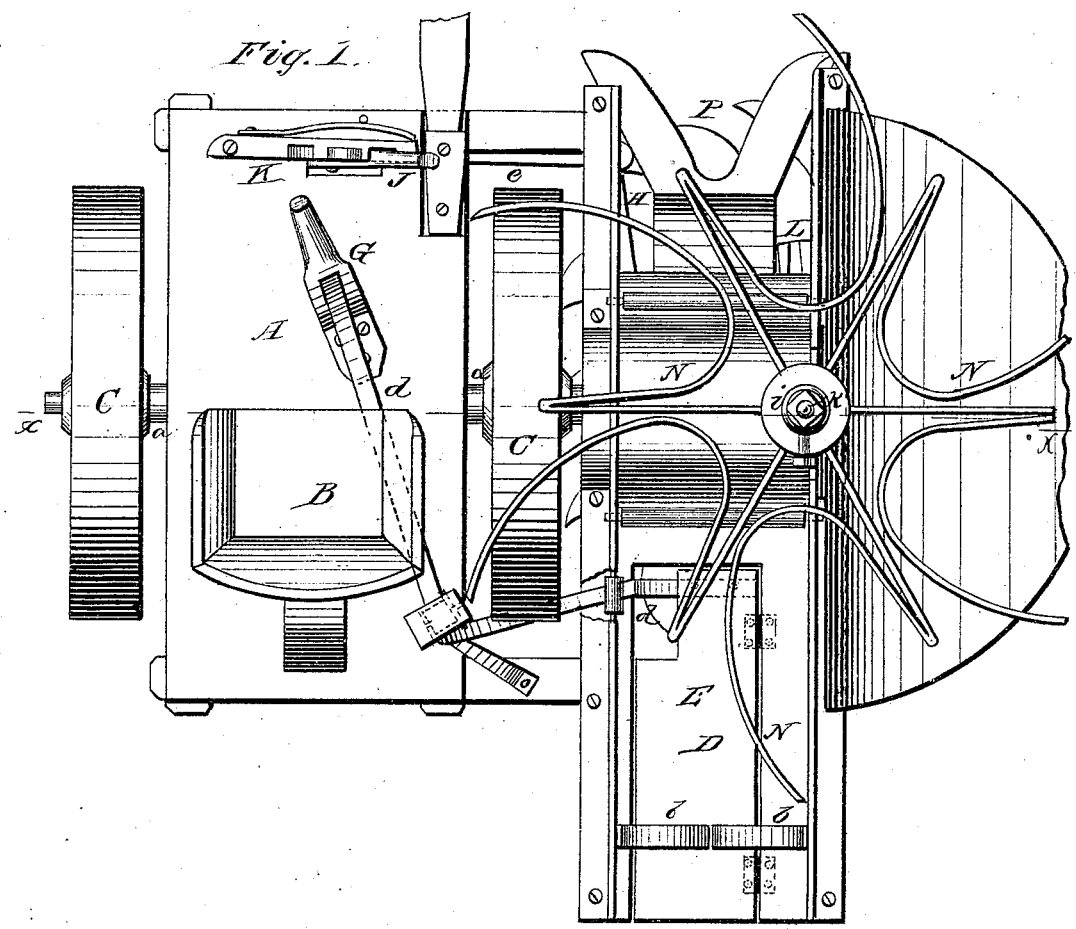

JACOB TOWNSEND AND JOHN N. PARR, OF EAGLETOWN, INDIANA.

IMPROVEMENT IN CORN-HARVESTERS.

Specification forming part of Letters Patent No. 170,315, dated November 23, 1875; application filed October 7, 1875.

*To all whom it may concern:*

Be it known that we, JACOB TOWNSEND and JOHN N. PARR, of Eagletown, in the county of Hamilton and State of Indiana, have invented certain new and useful Improvements in Corn-Stalk Cutters; and we do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of our invention consists in the construction and arrangement of a corn-stalk cutter, as will be hereinafter more fully set forth.

In the annexed drawing, Figure 1 is a plan view of our machine, and Fig. 2 is a longitudinal vertical section of the same.

A represents a platform, of any suitable dimensions, supporting the seat B for the driver, and provided with an axle, $a$, upon which are placed the driving-wheels C C. One or both of these wheels should be fast on the axle, so that the axle will be rotated as the machine is moving. On the side of the platform is a frame containing an open box, D, into which the corn-stalks are deposited after being cut. This box is provided with a hinged drop-bottom, E, to be let down when a sufficiently large bundle has been collected in the box. The stalks that are cut while the bottom E is dropped are supported by means of two springs, $b\ b$, attached to the sides of the box. The drop-bottom E is connected by means of a strap, $d$, with a lever, G, hinged to the platform in front of the driver's seat, the strap passing over a suitable roller in a standard, so that by means of the lever the drop-bottom can be raised as soon as the stalks have been emptied. The axle $a$ is extended under the box D, and has a beveled pinion, I, placed thereon in such a manner that it can be moved out and in a short distance to be thrown in and out of gear, and still always revolve with the axle. The pinion I is formed with a grooved hub, in which is placed the forked rear end of a lever, H, pivoted under the box, and the front end of this lever is, by a rod, $e$, connected with a lever, J, pivoted in a slot in the front part of the platform A. By turning the lever to the right or left the pinion I is thrown in and out of gear with a large beveled cog-wheel, L, and the lever is held in either position by means of a spring-latch, K. The beveled cog-wheel L is secured on a vertical hollow shaft, $h$, passing up through a bearing at the outer side of the box, and having its lower bearing in a shoe, M, attached under the box. On the upper end of the hollow shaft $h$ is secured a reel, N, constructed of a hub with a series of bent and curved wire arms to draw in the corn-stalks as they are cut and deposit them in the box D. Through the hollow shaft $h$ is passed a solid shaft, $k$, to the lower end of which is attached a disk, O, by means of a rod or pin passing through vertical slots in the hollow shaft. To this disk O are secured a series of curved knives, P P, as shown.

When the machine is in motion and the pinion I thrown in gear with the wheel L, both the shafts $h$ and $k$ are revolved, so that the cutters P will cut the corn-stalks, and the reel N draw them in and deposit them in the box D. The knives may be raised or lowered, so as to cut high or low, as desired, by means of a nut, $i$, on the upper end of the shaft $k$.

Having thus fully described our invention, what we claim as new, and desire to secure by Letters Patent, is—

1. The combination, in a stalk-cutter, of the box D, drop-bottom E, strap $d$, and hinged lever G, substantially as and for the purposes herein set forth.

2. In a corn-stalk-cutter, the combination of the hollow slotted shaft $h$, interior shaft $k$, disk O, with knives P, and reel N, all constructed and arranged to operate substantially as and for the purposes herein set forth.

In testimony that we claim the foregoing as our own we affix our signatures in presence of two witnesses.

JACOB TOWNSEND.
JOHN N. PARR.

Witnesses:
JAMES MARTIN,
GEORGE W. TOWNSEND.